United States Patent
Jin et al.

(10) Patent No.: US 10,208,193 B2
(45) Date of Patent: Feb. 19, 2019

(54) REINFORCED POLYPROPYLENE COMPOSITION

(71) Applicant: Dow Global Technologies LLC, Midland, MI (US)

(72) Inventors: Yi Jin, Missouri City, TX (US); Kim L. Walton, Freeport, TX (US); Edmund M. Carnahan, Pearland, TX (US); Gary R. Marchand, Gonzales, LA (US); Xuming Chen, Katy, TX (US); Jeffrey D. Weinhold, Lake Jackson, TX (US); Jerzy Klosin, Midland, MI (US); A. Willem Degroot, Sugarland, TX (US); Philip P. Fontaine, Alvin, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/898,682

(22) PCT Filed: Jun. 24, 2013

(86) PCT No.: PCT/US2013/047267
§ 371 (c)(1),
(2) Date: Dec. 15, 2015

(87) PCT Pub. No.: WO2014/209256
PCT Pub. Date: Dec. 31, 2014

(65) Prior Publication Data
US 2016/0251505 A1  Sep. 1, 2016

(51) Int. Cl.
C08L 23/12 (2006.01)
C08K 3/34 (2006.01)
C08L 23/08 (2006.01)
C08L 53/00 (2006.01)

(52) U.S. Cl.
CPC ............. *C08L 23/12* (2013.01); *C08K 3/34* (2013.01); *C08L 23/0815* (2013.01); *C08L 53/00* (2013.01)

(58) Field of Classification Search
CPC ...... C08L 23/12; C08L 23/0815; C08L 53/00; C08L 2023/44; C08L 23/16; C08K 3/34
See application file for complete search history.

(56) References Cited

U.S. PATENT DOCUMENTS

| | | | |
|---|---|---|---|
| 5,118,753 A | 6/1992 | Hikasa et al. |
| 5,272,236 A | 12/1993 | Lai et al. |
| 5,278,272 A | 1/1994 | Lai et al. |
| 5,681,897 A | 10/1997 | Silvis et al. |
| 5,688,866 A | 11/1997 | Silvis et al. |

(Continued)

FOREIGN PATENT DOCUMENTS

| | | |
|---|---|---|
| JP | H09111090 A | 4/1997 |
| JP | H10251464 A | 9/1998 |

OTHER PUBLICATIONS

Green, Michael W. "Injection Molding Thermoplastics". Modern Plastics Encyclopedia '89, Mid Oct. 1988 Issue, vol. 65 (11), 270-271. 1989.

(Continued)

*Primary Examiner* — Satya B Sastri

(57) ABSTRACT

Embodiments of the invention provide a reinforced polypropylene comprising a multi-modal molecular weight distribution elastomer and a block composite.

3 Claims, 4 Drawing Sheets

(56) References Cited

U.S. PATENT DOCUMENTS

| | | |
|---|---|---|
| 5,795,941 A | 8/1998 | Cree et al. |
| 5,804,660 A | 9/1998 | Whetten et al. |
| 5,919,983 A | 7/1999 | Rosen et al. |
| 5,986,028 A | 11/1999 | Lai et al. |
| 6,121,376 A | 9/2000 | Mikielski et al. |
| 6,369,176 B1 | 4/2002 | Laughner et al. |
| 6,376,623 B1 | 4/2002 | Hoenig et al. |
| 6,451,894 B1* | 9/2002 | Srinivasan .............. C08L 23/06 524/425 |
| 6,528,136 B1 | 3/2003 | Ho et al. |
| 6,680,361 B1 | 1/2004 | Cady et al. |
| 6,875,816 B2 | 4/2005 | DeGroot et al. |
| 7,247,679 B2 | 7/2007 | Datta et al. |
| 7,582,696 B2 | 9/2009 | Nakayama et al. |
| 8,318,896 B2 | 11/2012 | Winniford et al. |
| 8,607,420 B2 | 12/2013 | De Campos et al. |
| 8,802,774 B2 | 8/2014 | Carnahan et al. |
| 8,846,805 B2 | 9/2014 | Kniesel et al. |
| 9,029,487 B2 | 5/2015 | Klosin et al. |
| 9,522,984 B2 | 12/2016 | Kaneno et al. |
| 9,650,505 B2 | 5/2017 | Fantinel et al. |
| 2005/0176892 A1 | 8/2005 | Weaver et al. |
| 2006/0211819 A1* | 9/2006 | Hoenig ............... C08L 23/0815 525/88 |
| 2008/0269412 A1 | 10/2008 | Carnahan et al. |
| 2010/0093964 A1 | 4/2010 | Van Damme et al. |
| 2010/0113729 A1 | 5/2010 | Kwon et al. |
| 2010/0240818 A1 | 9/2010 | Walton et al. |
| 2011/0082249 A1* | 4/2011 | Shan ................... C08F 297/083 524/505 |
| 2011/0082257 A1* | 4/2011 | Carnahan ............ C08F 297/083 525/88 |
| 2011/0282018 A1 | 11/2011 | Klosin et al. |
| 2012/0015123 A1 | 1/2012 | Kwon et al. |
| 2014/0303325 A1 | 10/2014 | Bernreitner et al. |

OTHER PUBLICATIONS

Irwin, Christopher. "Extrusion-Blow Molding". Modern Plastics Encyclopedia '89, Mid Oct. 1988 Issue, vol. 65 (11), 217-218. 1989.

Parker, H. Randall. "Introduction to Injection Molding". Modem Plastics Encyclopedia '89, Mid Oct. 1988 Issue, vol. 65 (11), 264-268. 1989.

Randall, J.C.; "A Review of High Resolution Liquid 13Carbon Nuclear Magnetic Resonance Characterizations of Ethylene-Based Polymers." JMS-Rev. Macromol. Chem. Phys., C29, 201-317 (1989).

Williams and Ward, "The Construction of a Polyethylene Calibration Curve for Gel Permeation Chromatography Usin Polystyrene Fractions." J. Polym. Sci., Polym. Let., 6, 621 (1968).

PCT/US2013/047267, International Search Report and Written Opinion dated Oct. 29, 2013.

PCT/US2013/047267, International Preliminary Report on Patentability dated Dec. 29, 2015.

* cited by examiner

REINFORCED POLYPROPYLENE COMPOSITION

FIELD OF THE INVENTION

This invention relates to a reinforced polypropylene composition comprising an elastomer and a block composite.

BACKGROUND OF THE INVENTION

Many different polymers and materials have been added to polymer compositions in attempting to enhance the composition's impact strength or maintain the impact strength while enhancing other properties. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an alpha-olefin of 2 or more carbon atoms. Modern Plastics Encyclopedia/89, mid October 1988 Issue, Volume 65, Number 11, pp. 110-117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are often produced from blends of an elastomeric material such as ethylene based random copolymers, ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. TPOs are often characterized by a balance of stiffness (modulus) and low temperature impact, good chemical resistance and broad use temperatures. Because of features such as these, TPOs are used in many applications, including automotive facia and wire and cable components, rigid packaging, molded articles, instrument panels, and the like.

Polypropylene (PP) homopolymers or PP random copolymers provide the desirable stiffness and clarity for many applications, but can suffer from poor impact properties due to a high Tg (0° C. for homopolymer PP, hPP). To overcome this deficiency, PP homopolymer is blended with PP copolymers and/or elastomers to improve its toughness, but often at the expense of its clarity and modulus.

Ideally the elastomer or compatibilizer should promote or produce elastomer particles that are small enough scale such that a minimum volume is needed to improve the impact performance without adversely affecting the modulus of the blend.

An additional improvement would be to develop an elastomer that improves the impact performance without adversely affecting its clarity or other preferred properties. Ideally, the modulus and clarity of the PP/propylene-containing elastomer blend product should be comparable to that of PP homopolymer.

SUMMARY OF THE INVENTION

The invention provides a composition comprising: polypropylene; an elastomer with bimodal or multi-modal molecular weight distribution characteristics and, optionally, bimodal or multi-modal composition characteristics; a block composite as a compatibilizer; and, an optional filler such as talc.

DETAILED DESCRIPTION

Polypropylene

Figure 1:
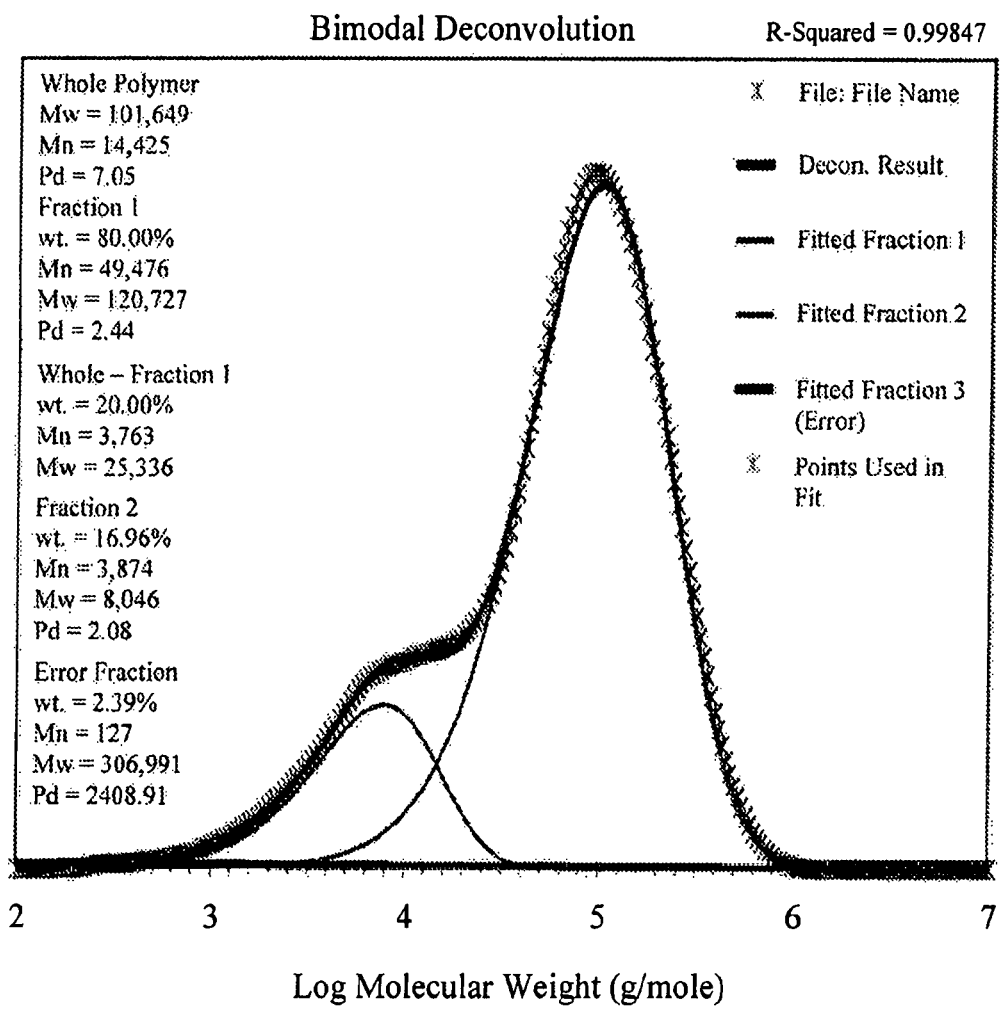
FIG. 1 shows a deconvoluted GPC curve for Example 1.

Impact modified compositions comprise a matrix polymer toughened via blending with an elastomer composition. In one embodiment, the matrix polymer is a polypropylene. Any polypropylene known to a person of ordinary skill in the art may be used to prepare the polymer blends disclosed herein. Non-limiting examples of polypropylene include low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof.

The amount of the polypropylene in the polymer blend, or composition, can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend. In one embodiment, the amount of the polypropylene in the polymer blend is about 50 wt %, 60 wt %, 70 wt % or 80 wt % by total weight of the polymer blend.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7 wt % ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min) to about 200 g/10 min, preferably from about 0.5 g/10 min to about 150 g/10 min, and especially from about 4 g/10 min to about 100 g/10 min. The propylene polymer can be a polypropylene homopolymer, or it can be a random copolymer or even an impact copolymer (which already contains a rubber phase). Examples of such propylene polymers include—impact copolymers, Profax Ultra SG583 from LyondellBasell Polyolefins or INSPIRE 114 from Braskem; homopolymer, H110N or D221.00, from Braskem; random copolymer, 6D43 from Braskem; random propylene-ethylene plastomers and elastomers such as VISTAMAXX™ (made by ExxonMobil), and VERSIFY™ (from The Dow Chemical Co.).

Multi-modal Molecular Weight Distribution (MMWD) Elastomer

The multi-modal molecular weight distribution (MMWD) elastomer comprises at least a high molecular weight (HMW) fraction and a low molecular weight fraction (LMW) and comprises ethylene and an α-olefin comonomer in polymerized form. Suitable comonomers for use in producing the elastomer include styrene, propylene, 1-butene, 1-hexene, 1-octene, 4-methyl-1-pentene, norbornene, 1-decene, 1,5-hexadiene, or a combination thereof. Preferably, the MMWD elastomer has two fractions. Each fraction has a molecular weight distribution (MWD) between 1.5 to 3. The HMW fraction has a $M_w$ above 100 Kg/mol, preferably above 150 Kg/mol, more preferably above 200 Kg/mol. The Mw of the high MW fraction should be no less than 75 Kg/mol. Suitable ranges for the HMW fraction molecular weight include 75 kg/mol to 600 kg/mol, 100 kg/mol to 400 kg/mol, and 150 kg/mol to 300 kg/mol. The low MW fraction has a molecular weight, $M_w$, below 50 Kg/mol, preferably below 25 Kg/mol. The Mw of the low MW fraction should be no less than 5 Kg/mol. Suitable ranges for the LMW fraction molecular weight include 5 kg/mol to 50 kg/mol, 7 kg/mol to 25 kg/mol, 10 kg/mol to 20 kg/mol. The high MW fraction is from 30 wt % to 90 wt %, preferably from 40 wt % to 80 wt % and more preferably from 50 wt % to 70 wt % of total elastomer. The low MW fraction is 10 up to 70 wt %, preferably 20 up to 60 wt % and more preferably from 30 wt % to 50 wt % of total elastomer. This elastomer has shear thinning characterized by $I_{10}/I_2>8$, more preferably >15. The $I_{10}/I_2$ is preferably from 8 to 120, more preferably from 15 to 60, even more preferably from 25 to 45.

This elastomer has overall density <0.90 g/cc. The high MW fraction is preferred to have equivalent or higher comonomer content than the low MW fraction. In particular, preferably the HMW fraction has a comonomer content that is at least 10% wt greater than that of the LMW fraction, preferably at least 15 wt % greater and more preferably at least 20 wt % greater. The above-described elastomer will provide optimum rheology for dispersion in PP and optimum MWD for impact modification.

Preferably, the elastomer has a bimodal molecular weight distribution, comprises greater than 50 wt % HMW fraction and has a difference in comonomer content between the HMW fraction and the LMW fraction that is at least 10 wt %.

The MMWD elastomer can be manufactured by any number of methods including in-situ in a single reactor or cascading reactors in series, or by post-reactor blending. Any polymerization media may be utilized including solution, slurry, or gas phase. The multimodal distribution elastomer may be part of cascading reactors in series that produces in-reactor blend polypropylene based impact copolymers. Preferably, it is made in a single reactor using two post-metallocene catalysts, one to produce the LMW fraction and one to produce the HMW fraction. Processes for producing the MMWD elastomer can be found, for example, in International Application Publication No. WO2002/074816. Suitable catalysts are disclosed in, for example, International Application Publication No. WO2012/027448 and US Patent Application Publication No. 2011/0282018.

Preferably the elastomer is present in an amount of 15 wt % to 30 wt %, preferably 16 wt % to 27 wt % and more preferably 18 wt % to 25 wt %, based on total weight of the composition.

Block Composite Compatibilizer

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s).

The term "block composite" refers to polymers comprising a soft copolymer, polymerized units in which the comonomer content is greater than 10 mol % and less than 90 mol % and preferably greater than 20 mol % and less than 80 mol %, and most preferably greater than 33 mol % and less than 75 mol %, a hard polymer, in which the monomer is present in an amount greater than 90 mol percent, and preferably greater than 93 mol percent, and more preferably greater than 95 mol percent, and most preferably greater than 98 mol percent and a block copolymer, preferably a diblock, having a soft segment and a hard segment, wherein the hard segment of the block copolymer is essentially the same composition as the hard polymer in the block composite and the soft segment of the block copolymer is essentially the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8. Such block composites are described in, for example, US Patent Application Publication Nos US2011-0082257, US2011-0082258 and US2011-0082249, all published on Apr. 7, 2011 and incorporated herein by reference with respect to descriptions of the block composites, processes to make them and methods of analyzing them. In particular, in the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above. Additionally, the block composites preferably have a Tm greater than 100° C., preferably greater than 120° C., and more preferably greater than 125° C. Preferably the MFR of the block composite is from 0.1 to 1000 dg/min, more preferably from 0.1 to 50 dg/min and more preferably from 0.1 to 30 dg/min. Further, the block composites of this embodiment of the invention have a weight average molecular weight (Mw) from 10,000 to about 2,500,000, preferably from 35000 to about 1,000,000 and more preferably from 50,000 to about 300,000, preferably from 50,000 to about 200,000.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the block composites of the invention comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Preferably the block composite is present in an amount of 3 wt % to 15 wt %, preferably 5 wt % to 10 wt % and more preferably from 6 wt % to 9 wt %, based on total weight of the composition.

Additives and Filler

Additives such as antioxidants (e.g., hindered phenolics (e.g., Irganox™ 1010), phosphites (e.g., Irgafos™ 168)), cling additives (e.g., PIB), antiblock additives, pigments, fillers (e.g., talc, diatomaceous earth, nano-fillers, clay, metal particles, glass fibers or particles, carbon black, other reinforcing fibers, etc.), and the like can also be included in the formulations. Preferably, the compositions comprise talc in an amount of 0 wt % to 35 wt %, 1 wt % to 25 wt % and more preferably 5 wt % to 25 wt % based on total weight of polymer. Other additives may be present in amounts of from 0.01 wt % to 1 wt %.

Applications and End-Uses

Useful fabricated articles or parts can be made from the formulations disclosed herein, using various processes, including various injection molding processes (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding", the disclosure of which is incorporated herein by reference) and profile extrusion. Some of the fabricated articles include fuel tanks, outdoor furniture, pipes, automotive container applications, automotive bumpers, facia, wheel covers and grilles, as well as other household and personal articles, including, for example, freezer containers. Of course, one skilled in the art can also combine polymers to advantageously use refractive index to improve, or maintain clarity of end use articles, such as freezer containers.

Test Methods

Density is measured in accordance with ASTM D 792.

Differential scanning calorimetry (DSC) is performed on compression molded specimens using a TA Instruments Q100 or Q1000 DSC and a crimp-sealed Perkin Elmer pan. Samples are equilibrated at −90° C. for 5 min, then heated at 10° C./min to 180° C. (capturing the "$1^{st}$ Heat DSC Curve"), held for 5 min, then cooled at 10° C./min. to −90° C. (capturing the "crystallization curve"), held for 5 minutes, then heated at 10° C./min to 180° C. (capturing the "$2^{nd}$ Heat DSC Curve"). The data is analyzed using TA Universal Analysis software after run completion.

Melt flow rate of the samples is measured using ASTM D 1238, Condition 230° C., 2.16 kg. Melt Index or $I_2$ is measured using ASTM D 1238, Condition 190° C., 2.16 kg. Melt flow rate of the samples is measured using ASTM D1238, Condition 230° C., 10 kg. Melt Index or $I_{10}$ is measured using ASTM D 1238, Condition 190° C., 10 kg.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

HTLC

High Temperature Liquid Chromatography (HTLC) is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by Polymer-Char, Valencia, Spain.

Columns: The D1 column was a high temperature Hypercarb graphite column (2.1×100 mm) purchased from Thermo Scientific. The D2 column was a PLRapid-H column purchased from Varian (10×100 mm)

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean step:
1. 490 min: flow=0.01 min; // Maintain the constant flow rate of 0.01 mL/min from 0-490 min.
2. 491 min: flow=0.20 min; // Increase the flow rate to 0.20 mL/min
3. 492 min: % B=100; // Increase the mobile phase composition to 100% TCB
4. 502 min: % B=100; // Wash the column using 2 mL of TCB Equilibrium step:
5. 503 min: % B=0; // Change the mobile phase composition to 100% of 1-decanol or decane
6. 513 min: % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition were the same as the initial conditions of the run gradient.

The D2 flow rate was at 2.51 mL/min. Two 60 µL loops were installed on the 10-port switch valve. 30-µL of the eluent from D1 column was loaded onto the SEC column with every switch of the valve.

The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

HT GPC

A high temperature Gel Permeation Chromatography system (GPC IR) consisting of an Infra-red concentration detector (IR-4) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Olexis, 13 micron columns. The chromatographic solvent (TCB) and the sample preparation solvent were from the same solvent source with 250 ppm of butylated hydroxytoluene (BHT) and nitrogen sparged. The samples were prepared at a concentration of 2 mg/mL in TCB. Polyethylene samples were gently shaken at 160° C. for 2 hours. The injection volume was 200 µl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.39.

A first order polynomial was used to fit the respective polyethylene-equivalent calibration points obtained from equation (1) to their observed elution volumes of polystyrene standards.

Number, weight, and z-average molecular weights were calculated according to the following equations:

$$\overline{Mn} = \frac{\sum\limits_i Wf_i}{\sum\limits_i (Wf_i / M_i)} \quad (2)$$

$$\overline{Mw} = \frac{\sum\limits_i (Wf_i * M_i)}{\sum\limits_i Wf_i} \quad (3)$$

$$\overline{Mz} = \frac{\sum\limits_i (Wf_i * M_i^2)}{\sum\limits_i (Wf_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The accurate A value was determined by adjusting A value in equation (1) until Mw calculated using equation (3) and the corresponding retention volume polynomial, agreed with the known Mw value of 115,000 g/mol of a standard linear polyethylene homopolymer reference.

GPC Deconvolution

The GPC data are deconvoluted to give the most probable fit for two molecular weight components. There are a number of deconvolution algorithms available both commercially and in the literature. These may lead to different answers depending upon the assumptions used. The algorithm summarized here is optimized for the deconvolution problem of the two most probable molecular weight distributions (plus an adjustable error term). In order to allow for the variations in the underlying distributions due to the macromer incorporation and small fluctuations in the reactor conditions (i.e. temperature, concentration) the basis functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1, 2, 3) are derived with the third component (j=3) being an adjustable error term. The GPC data must be normalized and properly transformed into weight fraction versus $Log_{10}$ molecular weight vectors. In other words, each potential curve for deconvolution should consist of a height vector, $h_i$, where the heights are reported at known intervals of $Log_{10}$ molecular weight, the $h_i$ have been properly transformed from the elution volume domain to the $Log_{10}$ molecular weight domain, and the $h_i$ are normalized. Additionally, these data should be made available for the Microsoft EXCEL™ application.

Several assumptions are made in the deconvolution. Each component, j, consists of a most probable, Flory, distribution which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector.

$$x^2(\mu_j, \sigma_j, w_j) = \sum_{i=1}^{n} \left[ \sum_{j=1}^{3} \cdot \sum_{k=1}^{20} w_j \cdot M_i^2 \cdot \lambda_{j,k}^2 \cdot CumND_{j,k} \cdot e^{-\lambda_{j,k} \cdot M_i} \cdot \Delta Log_{10}M - h_i \right]^2$$

$$\lambda_{j,k} = 10^{\mu_j + \frac{k-10}{3} \cdot \sigma_j}$$

The variable, $CumND_{j,k}$, is calculated using the EXCEL™ function "NORMDIST(x, mean, standard_dev, cumulative)" with the parameters set as follows:

$x = \mu_j + (k-10) * \sigma_j / 3$ mean=$\mu_j$ standard dev=$\sigma_j$ cumulative=TRUE Table I below summarizes these variables and their definitions. The use of the EXCEL™ software application, Solver, is adequate for this task. Constraints are added to Solver to insure proper minimization.

TABLE I

Variable Definitions

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j. |
| $w_j$ | Weight fraction of component j |
| K | Normalization term (1.0/$Log_e$ 10) |
| $M_i$ | Molecular weight at elution volume slice i |
| $h_i$ | Height of $log_{10}$ (molecular weight) plot at slice i |
| n | Number of slices in Log molecular weight plot |
| i | Log molecular weight slice index (1 to n) |
| j | Component index (1 to 3) |
| 1. k | Normal distribution slice index |
| $\Delta log_{10}M$ | Average difference between $log_{10}M_i$ and $log_{10}M_{i-1}$ in height vs. $log_{10}M$ plot |

The 8 parameters that are derived from the Chi-square minimization are $\mu_1, \mu_2, \mu_3, \sigma_1, \sigma_2, \sigma_3, w_1$, and $w_2$. The term $w_3$ is subsequently derived from $w_1$ and $w_2$ since the sum of the 3 components must equal 1. Table II is a summary of the Solver constraints used in the EXCEL program.

TABLE II

Constraint summary

| Description | Constraint |
|---|---|
| Maximum of fraction 1 | $w_1 < 0.95$ (User adjustable) |
| Lower limit of spreading function | $\sigma_1, \sigma_2, \sigma_3 > 0.001$ (must be positive) |
| Upper limit of spreading function | $\sigma_1, \sigma_2, \sigma_3 < 0.2$ (User adjustable) |
| Normalized fractions | $w_1 + w_2 + w_3 = 1.0$ |

Additional constraints that are to be understood include the limitation that only $\mu_j > 0$ are allowed, although if Solver is properly initialized, this constraint need not be entered, as the Solver routine will not move any of the $\mu_j$ to values less than about 0.005. Also, the $w_j$ are all understood to be positive. This constraint can be handled outside of Solver. If the $w_j$ are understood to arise from the selection of two points along the interval $0.0<P_1<P_2<1.0$; whereby $w_1=P_1$, $w_2=P_2-P_1$ and $w_3=1.0-P_2$; then constraining P1 and P2 are equivalent to the constraints required above for the $w_j$.

Table III is a summary of the Solver settings under the Options tab.

TABLE III

Solver settings

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of $\mu_1$, $\mu_2$, $w_1$, and $w_2$ can be obtained by assuming two ideal Flory components that give the observed weight average, number average, and z-average molecular weights for the observed GPC distribution.

$$M_{n,GPC} = \left[ w_1 \cdot \frac{1}{10^{\mu_1}} + w_2 \cdot \frac{1}{10^{\mu_2}} \right]^{-1}$$

$$M_{w,GPC} = [w_1 \cdot 2 \cdot 10^{\mu_1} + w_2 \cdot 2 \cdot 10^{\mu_2}] / M_{n,GPC}$$

$$M_{z,GPC} = [w_1 \cdot 6 \cdot 10^{\mu_1} + w_2 \cdot 6 \cdot 10^{\mu_2}] / M_{w,GPC}$$

$$w_1 + w_2 = 1$$

The values of $\mu_1$, $\mu_2$, $w_1$, and $w_2$ are then calculated. These should be adjusted carefully to allow for a small error term, $w_3$, and to meet the constraints in Table II before entering into Solver for the minimization step. Starting values for $\sigma_j$ are all set to 0.05.

Octene Content Determination from HT GPC IR:

The octene content was determined using an IR-5 composition detector from Polymer Char Inc. The compotation detector was calibrated using 11 metallocene solution produced ethylene/octene (EO) copolymers with octene wt % from 0 to 40 and one polyoctene (PO) homopolymer (100 wt % octene). All polymers have Mw around 40K or 100K respectively. The signal at the peak position was used for calibration. A linear relationship of octene wt % and IR-5 methyl/methylene signal ratio was built these EO copolymers and the PO polymer.

The octene wt % distribution of a resin was obtained by using the IR-5 methyl/methylene signals and the linear calibration of octene wt % and IR-5 methyl/methylene signal ratio. The polymer chain end effect was corrected as vinyl chain end.

For the bimodal resins, wt % of octene in each fraction was calculated as follows. For the high weight fraction (main peak), the octene wt % was calculated using the plateau of distribution curve at the main peak area. For the low weight fraction area (small peak), octene wt % was calculated in a narrow MW range (0.3 in log MW scale) in order to avoid the contamination of the main peak, and the scattering octene wt % signal at the elution low concentration ends.

Izod Impact Tests

The notched Izod impact tests were done on injection molded ASTM specimens cut from tensile bars to have the dimensions of 62 mm×19 mm×3.175 mm. The samples were notched using a notcher to produce a notch depth 10.16±0.05 mm according to ASTM D256. Five specimens of each sample were tested using ASTM D256 at 23° C. Where the energy value in KJ/m² was reported, the reported energy value in KJ/m² was derived by multiplying energy value in ft-lbs/in with a conversion factor of 5.25.

Flexural Modulus

The flexural modulus test was performed according to ISO 178 at 2 mm per minute utilizing a span of 2.5 inches on a 5 station United flex frame, after conditioning for 40 hours at 73° F. and 50% relative humidity. Chord modulus was reported utilizing the stress values at 0.5 and 0.25% strain. The average and standard deviation were reported.

Viscosity and Viscosity Ratio (P)

The dynamic mechanical spectra (DMS) of the materials were obtained using a ARES II rheometer from TA Instruments. The rheometer was equipped with 25 mm diameter parallel plates and the gap between the plates was set at 2 mm. All measurements were performed at 190° C. with the frequency varied from 100-0.1 rad/s at 10% strain. P is defined as the viscosity of dispersed elastomer phase @ 100 s$^{-1}$ divided by the viscosity of PP matrix phase @ 100 s$^{-1}$.

Atomic Force Microscopy (AFM)—Area Weighted Average Diameter (Da) (Microns) Measurement Compression molded plaques of each blends were used for AFM imaging. A small portion of the compression molded plaque was microtomed under cryogenic conditions of −120° C. to produce a polished blockface. A Dimension 3100 DI/Veeco atomic force microscope was operated in tapping mode with phase detection. Operating software is v7.30. Tips used for all scans are MikroMasch NCS #16 with a resonant frequency of ~170 khz and a spring constant of 40 N/m. Image analysis was performed on five 60×60 mm² scans to obtain particle size distribution for each blend. The area weighted average diameter ($D_a$):

$$D_a = \Sigma_{i=1}^n A_i D_i / \Sigma_{i=1}^n A_i$$

Where $A_i$ is the area of each particle; $D_i$ is the diameter of each particle.

EXAMPLES

MMWD Elastomer Examples 1-3 and Comparative C1 and C2

For examples 1-3 and comparative 1-2, a cocatalyst, bis(hydrogenated tallow alkyl)methylammonium tetrakis (pentafluorophenyl)borate having the approximate formula, $[(C_{14-18}H_{27-35})_2CH_3N]^+[B(C_6F_5)_4]^-$, was employed in a 1.2 to 1 molar ratio with the catalyst. The cocatalyst was purchased from Boulder Scientific and used without further purification. Catalyst A is dimethyl[[2',2'''-[1,3-propanediyl-bis(oxy-κO)]bis[3-[3,6-bis(1,1-dimethylethyl)-9H-carbazol-9-yl]-5'-fluoro-5-(1,1,3,3-tetramethylbutyl) 1,1'-biphenyl]-2-olato-κO]](2-)]-hafinum and can be prepared as described in WO2012027448 Example 1. Catalyst B is dimethyl[[2',2'''-[1,3-propanediylbis(oxy-κO)]bis[3-[3,6-bis (1,1-dimethylethyl)-9H-carbazol-9-yl]-3',5'-difluoro-5-(1,1, 3,3-tetramethylbutyl)[1,1'-biphenyl]-2-olato-κO]](2-)]-hafnium and can be prepared according to US20110282018 example 1. Catalyst C is dimethyl[[2',2'''-[1,3-propanediyl-bis(oxy-κO)]bis[3-[3,6-bis(1,1-dimethylethyl)-9H-carbazol-9-yl]-5'-fluoro-5-(1,1,3,3-tetramethylbutyl) 1,1'-biphenyl]-2-olato-κO]](2-)]-zirconium and can be prepared from ligand Q1 disclosed in WO2012027448 and $ZrCl_4$ in a manner analogous to the synthesis of Catalyst A. For all examples, a cocatalyst, is employed in a 1.2 to 1 molar ratio to catalyst.

Comparative Examples 3, 4 and 5 are 1.6% BSA (ENGAGE 8407), ENGAGE 8200 and ENGAGE 8100 respectively.

TABLE 1

Polymer process data for MMWD elastomer

| Polymer | Catalyst 1 | Catalyst 2 | Temp (° C.) | Solvent Flow (lb/h) | $C_2$ Flow (lb/h) | $C_8$ Flow (lb/h) | $H_2$ Flow (sccm) | $[C_2]$ (g/L) | Conversion (%) | % Solids | Cat 1 Conc (ppm M) | Cat 1 Flow (lb soln/h) | Cat 2 Conc (ppm M) | Cat 2 Flow (lb soln/h) |
|---|---|---|---|---|---|---|---|---|---|---|---|---|---|---|
| 1 | A | B | 180 | 40.79 | 3.05 | 4.31 | 21.90 | 2.98 | 92.9 | 9.9 | 4.30 | 0.25 | 8.70 | 0.12 |
| 2 | A | B | 180 | 40.73 | 3.06 | 5.20 | 1.98 | 3.03 | 92.8 | 10.4 | 4.30 | 0.28 | 8.38 | 0.21 |
| 3 | A | B | 165 | 42.66 | 3.09 | 5.79 | 4.94 | 3.02 | 92.6 | 10.2 | 4.30 | 0.15 | 8.38 | 0.17 |
| C1 | C | B | 130 | 42.61 | 3.06 | 3.70 | 0.93 | 2.89 | 93.2 | 9.8 | 3.30 | 0.15 | 4.08 | 0.11 |
| C2 | C | A | 160 | 42.54 | 3.10 | 3.50 | 18.12 | 2.95 | 92.9 | 9.5 | 2.88 | 0.15 | 1.10 | 0.51 |

TABLE 2

Polymer property data for MMWD elastomer with molecular weight information determined by HT GPC

| Polymer | Wt percent polymer from Catalyst 1 (based on total weight of polymer) | Octene wt % by NMR | Tg, ° C. | $I_2$ | $I_{10}/I_2$ | Mn | Mw | Mz | Mw/Mn |
|---|---|---|---|---|---|---|---|---|---|
| 1 | 48 | 39.3 | −49.4 | 0.8875 | 18 | 14,427 | 101,582 | 220,613 | 7.04 |
| 2 | 59 | 39.9 | −51 | 1.015 | 24 | 9,913 | 118,200 | 296,871 | 11.92 |
| 3 | 68 | 40.6 | −52.6 | 1.11 | 36 | 9,630 | 132,987 | 363,697 | 13.81 |
| C1 | 32 | 39.4 | −45.9 | 1.04 | 15 | 32,244 | 95,110 | 185,515 | 2.95 |
| C2 | 40 | 36.4 | −44.9 | 1.1745 | 17 | 26,652 | 102,533 | 302,154 | 3.85 |
| C3 | NA[1] | NM[2] | −44.5 | 1.1 | 12.4 | 23,136 | 47,969 | 81,953 | 2.07 |
| C4 | NA[1] | NM[2] | −44.2 | 4.9 | 7.5 | 54300 | 107100 | 193100 | 1.97 |
| C5 | NA[1] | NM[2] | −43.4 | 0.9 | 7.5 | 75100 | 149400 | 283500 | 1.99 |

[1] Not applicable
[2] Not measured

TABLE 3

Polymer property data for MMWD elastomer with molecular weight information determined by HT GPC Deconvolution

| Example | Overall Mn | Overall Mw | Overall MWD | HMW Mw | HMW Mn | HMW MWD | LMW Mw | LMW Mn | LMW MWD | % HMW |
|---|---|---|---|---|---|---|---|---|---|---|
| 1 | 14,427 | 101,582 | 7.04 | 120730 | 49480 | 2.44 | 8050 | 3870 | 2.08 | 80 |
| 2 | 9,913 | 118,200 | 11.92 | 169820 | 66680 | 2.55 | 8200 | 3980 | 2.06 | 70 |
| 3 | 9,630 | 132,987 | 13.81 | 216640 | 87680 | 2.47 | 10400 | 4760 | 2.18 | 61 |
| C1 | 32,244 | 95,110 | 2.95 | 98420 | 36730 | 2.68 | 13280 | 34780 | 2.78 | 99 |
| C2 | 26,652 | 102,533 | 3.85 | 269820 | 124560 | 2.17 | 50720 | 22070 | 2.3 | 24 |

HMW = High Molecular Weight fraction from GPC deconvolution
LMW = Low Molecular Weight fraction from GPC deconvolution

TABLE 4

Polymer property data with comonomer content information for each mode determined by HT GPC using an IR-5 composition detector.

| Polymer | Mn | Mw | Mw/Mn | HMW Octene wt % | LMW Octene wt % | MW range* |
|---|---|---|---|---|---|---|
| Example 1 | 14,427 | 101,582 | 7.04 | 43.63 | 14.30 | 3.3-3.6 |
| Example 2 | 9,913 | 118,200 | 11.92 | 48.35 | 18.30 | 3.3-3.6 |
| Example 3 | 9,630 | 132,987 | 13.81 | 53.14 | 15.79 | 3.3-3.6 |
| C1 | 32,244 | 95,110 | 2.95 | 40.33 | —** | — |
| C2 | 26,652 | 102,533 | 3.85 | 38.48 | 35.98 | 5.5-5.8 |

*log MW range used for small peak composition calculation
**single peak

Preparation of Block Composite

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-K O]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The block composite of the present Example is designated BC. It is prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor.

TABLE 5

Polymer Process for Block Composite

| Condition | 1st reactor | 2nd reactor |
|---|---|---|
| Reactor Control Temp. (° C.) | 95 | 105 |
| Solvent Feed (lb/hr) | 115 | 115 |
| Propylene Feed (lb/hr) | 20.0 | 29.7 |
| Ethylene Feed (lb/hr) | 10.3 | 0 |
| Reactor Propylene Conc. (g/L) | 2.0 | 2.5 |
| Hydrogen Feed (SCCM) | 13.6 | 9.7 |
| Catalyst Efficiency (gPoly/gM)*$10^6$ | 2.5 | 0.16 |
| Catalyst Flow (lb/hr) | 0.40 | 0.98 |
| Catalyst Conc. (ppm) | 29.9 | 200 |
| Cocatalyst-1 Flow (lb/hr) | 0.54 | 0.65 |
| Cocatalyst-1 Conc. (ppm) | 300 | 3000 |
| Cocat.-2 Flow (lb/hr) | 0.75 | 0 |
| Cocat.-2 Conc. (ppm) | 2000 | 0 |
| DEZ Flow (lb/hr) | 0.80 | 0 |
| DEZ Concentration (ppm) | 30000 | 0 |

TABLE 6

Physical Properties for Block Composite

| Example | MFR (230° C./2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) |
|---|---|---|---|---|---|---|---|---|
| BC | 5.5 | 22 | 130,020 | 4.37 | 33.5 | 138.1 (30.0) | 92.9 | 21.3 |

| Sample | Wt % iPP | Wt % EP | Wt % $C_2$ in EP | Block Composite Index |
|---|---|---|---|---|
| BC | 49 | 51 | 65 | 0.58 |

Other Components

TABLE 7

Polypropylene and Additional Comparative Examples

| Component | Description | Properties |
|---|---|---|
| PP | Polypropylene H734-R52 (Braskem) | 52 MFR homopolymer |
| C3 | BSA modified ENGAGE 8407 POE (The Dow Chemical Company) | 1.1 MI (190° C./2.16 kg, ASTM D1238, density 0.870 g/cc) |
| C4 | ENGAGE 8200 POE (The Dow Chemical Company) | 5.0 MI (190° C./2.16 kg, ASTM D1238); density 0.870 g/cc |
| C5 | ENGAGE 8100 POE (The Dow Chemical Company) | 1.0 MI (190° C./2.16 kg, ASTM D1238); density 0.870 g/cc |

C3—BSA (Azidocarbonamide) Modification of ENGAGE 8407 POE

BSA coupling of ENGAGE 8407 POE (polyolefin elastomer) is done by melt blending on a 30 mm, Coperion WP-30ZSK, co-rotating, twin-screw extruder at a speed of 100 RPM. In order to reduce the chain scission during melt blending, Molecular Melt (DPO-BSA) powder was used as the source of BSA. It has a ratio of 3.3 parts IRGANOX 1010 and 1 part BSA. 1.6 wt % of Molecular Melt is melt blended with ENGAGE 8407 by using the above process, resulting in BSA modified POE with MI 1.1.

Blends

Compounding and Injection Molding of the PP/MWMD Elastomer/BC Samples

All components were dry tumbled and directly blended using either a Leistritz micro-18 twin screw extruder or a ZSK-25 twin screw extruder. Injection molded ASTM D-638 Type I tensile bars were obtained for mechanical testing using an Arburg 370 C injection molder.

TABLE 8

Polypropylene blend compositions - amounts given in weight percent based on total weight of blends

| Blend | PP | Example 1 | Example 2 | Example 3 | C1 | C2 | C3 | C4 | C5 | BC | Talc |
|---|---|---|---|---|---|---|---|---|---|---|---|
| Blend C1 | 75 | 0 | 0 | 0 | 25 | 0 | 0 | 0 | 0 | 0 | 0 |
| Blend C1-BC | 68.6 | 0 | 0 | 0 | 22.8 | 0 | 0 | 0 | 0 | 8.6 | 0 |
| Blend C2 | 75 | 0 | 0 | 0 | 0 | 25 | 0 | 0 | 0 | 0 | 0 |
| Blend C2-BC | 68.6 | 0 | 0 | 0 | 0 | 22.8 | 0 | 0 | 0 | 8.6 | 0 |
| Blend C3 | 75 | 0 | 0 | 0 | 0 | 0 | 25 | 0 | 0 | 0 | 0 |
| Blend C3-T | 60 | 0 | 0 | 0 | 0 | 0 | 20 | 0 | 0 | 0 | 20 |
| Blend C3-BC | 68.6 | 0 | 0 | 0 | 0 | 0 | 22.8 | 0 | 0 | 8.6 | 0 |
| Blend C3-BC-T-1 | 54.8 | 0 | 0 | 0 | 0 | 0 | 18.3 | 0 | 0 | 6.9 | 20 |
| Blend C3-BC-T-2 | 54.8 | 0 | 0 | 0 | 0 | 0 | 18.3 | 0 | 0 | 6.9 | 20 |
| Blend C4 | 75 | 0 | 0 | 0 | 0 | 0 | 0 | 25 | 0 | 0 | 0 |
| Blend C4-BC | 68.6 | 0 | 0 | 0 | 0 | 0 | 0 | 22.8 | 0 | 8.6 | 0 |
| Blend C5 | 75 | 0 | 0 | 0 | 0 | 0 | 0 | 0 | 25 | 0 | 0 |
| Blend C5-T | 60 | 0 | 0 | 0 | 0 | 0 | 0 | 0 | 20 | 0 | 20 |
| Blend C5-BC-1 | 68.6 | 0 | 0 | 0 | 0 | 0 | 0 | 0 | 22.8 | 8.6 | 0 |
| Blend C5-BC-2 | 68.6 | 0 | 0 | 0 | 0 | 0 | 0 | 0 | 22.8 | 8.6 | 0 |
| Blend C5-BC-T | 54.8 | 0 | 0 | 0 | 0 | 0 | 0 | 0 | 18.3 | 6.9 | 20 |
| Blend 1 | 75 | 25 | 0 | 0 | 0 | 0 | 0 | 0 | 0 | 0 | 0 |
| Blend 1-BC | 68.6 | 22.8 | 0 | 0 | 0 | 0 | 0 | 0 | 0 | 8.6 | 0 |
| Blend 2 | 75 | 0 | 25 | 0 | 0 | 0 | 0 | 0 | 0 | 0 | 0 |
| Blend 2-BC | 68.6 | 0 | 22.8 | 0 | 0 | 0 | 0 | 0 | 0 | 8.6 | 0 |
| Blend 3 | 75 | 0 | 0 | 25 | 0 | 0 | 0 | 0 | 0 | 0 | |
| Blend 3-T | 60 | 0 | 0 | 20 | 0 | 0 | 0 | 0 | 0 | 0 | 20 |
| Blend 3-BC | 68.6 | 0 | 0 | 22.8 | 0 | 0 | 0 | 0 | 0 | 8.6 | |
| Blend 3-BC-T-1 | 54.8 | 0 | 0 | 18.3 | 0 | 0 | 0 | 0 | 0 | 6.9 | 20 |
| Blend 3-BC-T-2 | 54.8 | 0 | 0 | 18.3 | 0 | 0 | 0 | 0 | 0 | 6.9 | 20 |

TABLE 9

Propylene blend properties - blends prepared with Micro-18 twin screw extruder

| Blend | P @ 100 s$^{-1}$ | $D_a$, (μm) | Avg Izod impact strength at 23° C., J/m, ASTM 256-10 |
|---|---|---|---|
| Blend C1 | 4.17 | 2.613 | 42.9 |
| Blend C1-BC | 4.17 | 1.538 | 277.0 |
| Blend C2 | 3.48 | 2.479 | 52.7 |
| Blend C2-BC | 3.48 | 1.635 | 178.8 |
| Blend C3 | 1.4 | 1.648 | 165.5 |
| Blend C3-BC | 1.4 | 1.025 | 408.3 |
| Blend C4 | 3.38 | 2.115 | 122.2 |
| Blend C4-BC | 3.38 | 1.388 | 164.9 |
| Blend C5 | 8.11 | 3.133 | 46.4 |
| Blend C5-BC | 8.11 | 1.836 | 115.8 |
| Blend 1 | 4.47 | 2.702 | 47.2 |
| Blend 1-BC | 4.47 | 1.493 | 486.3 |
| Blend 2 | 3.26 | 2.462 | 64.6 |
| Blend 2-BC | 3.26 | 1.38 | 518.9 |
| Blend 3 | 2.61 | 1.869 | 117.9 |
| Blend 3-BC | 2.61 | 1.059 | 523.1 |

TABLE 10

Blend properties with and without talc - blends prepared by ZSK-25 twin screw extruder.

| Blend | Chord Mod avg (10$^5$ PSI) | Izod 23° C. Impact Strength, (kJ/m$^2$), ISO 180/1A |
|---|---|---|
| Blend C3 | 1.521 | 7.8 |
| Blend C3-T | 2.433 | 8.9 |
| Blend C3-BC | 1.416 | 28.1 |
| Blend C3-BC-T-1 | 2.231 | 15.0 |
| Blend C3-BC-T-2 | 2.203 | 11.1 |
| Blend C5 | 1.529 | 7.7 |
| Blend C5-T | 2.436 | 25.8 |
| Blend C5-BC-1 | 1.357 | 54.5 |
| Blend C5-BC-2 | 1.283 | 55.4 |
| Blend C5-BC-T | 2.226 | 28.3 |
| Blend 3 | 1.274 | 12.8 |
| Blend 3-T | 2.139 | 22.8 |
| Blend 3-BC | 1.154 | 117.4 |
| Blend 3-BC-T-1 | 2.102 | 55.6 |
| Blend 3-BC-T-2 | 1.996 | 51.6 |

Figure 2:
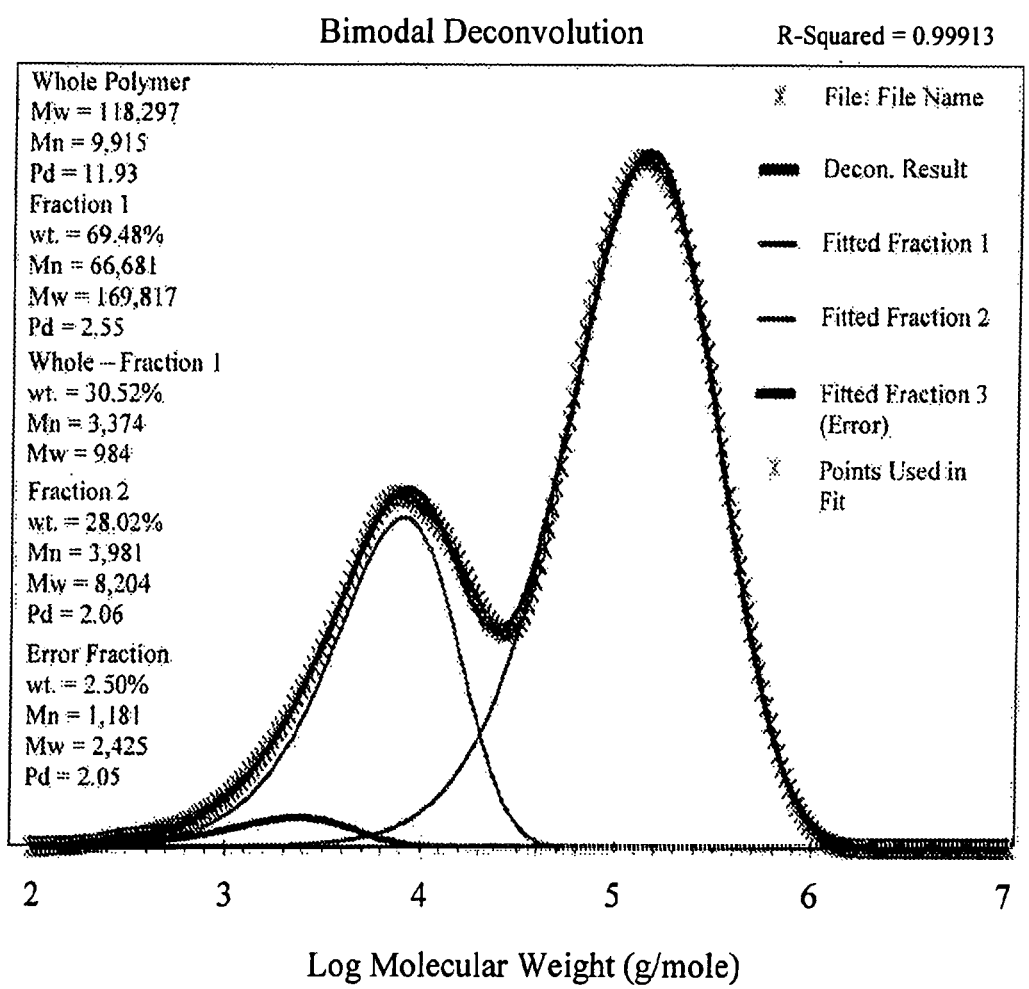
FIG. 2 shows a deconvoluted GPC curve for Example 1.
Figure 3:
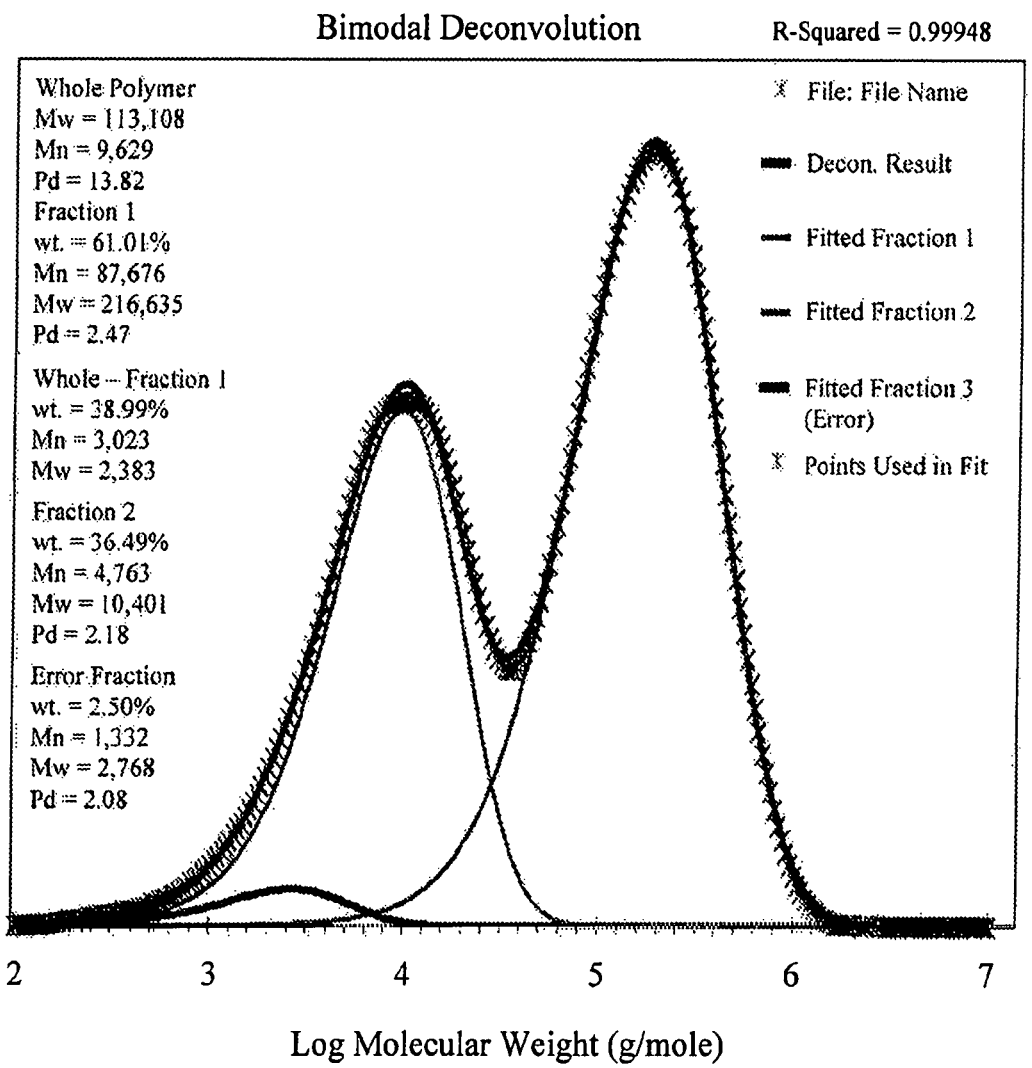
FIG. 3 shows a deconvoluted GPC curve for Example 1.
Figure 4:
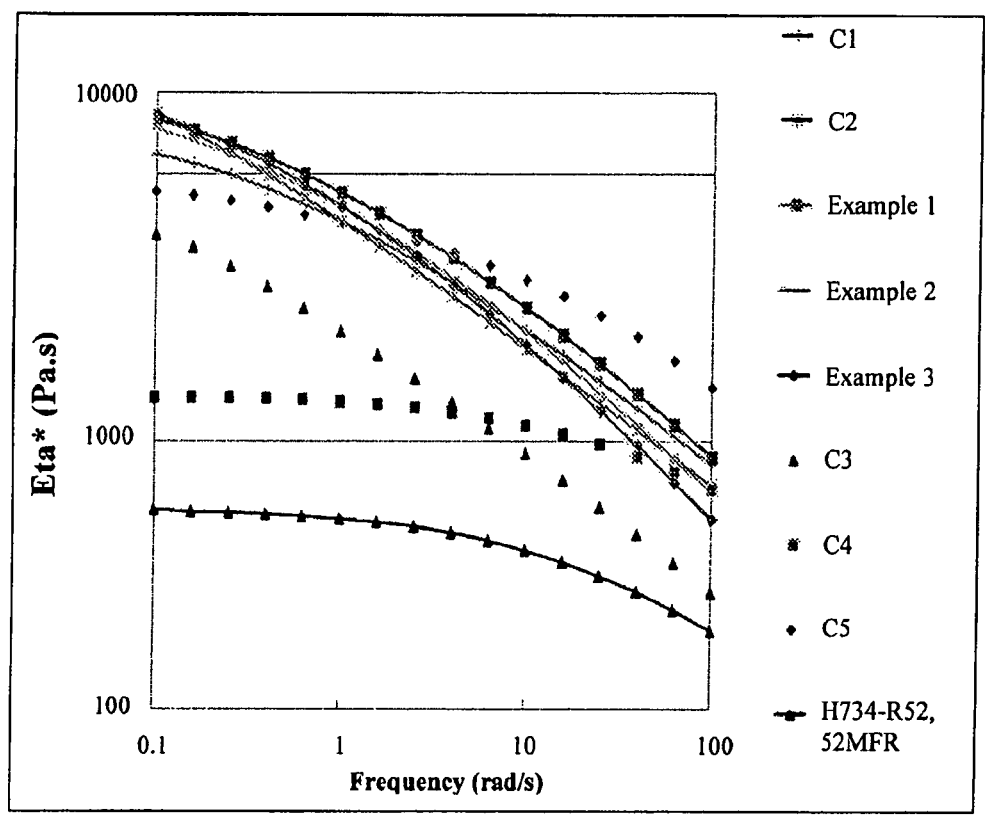
FIG. 4 shows viscosity curves for the indicated polymers.

FIGS. 1, 2 and 3 show the deconvolution HT-GPC plots of inventive Examples 1, 2, and 3. As can be seen, these inventive elastomers show a distinct bimodal molecular weight distribution and composition distribution. As described above in Test Methods, the GPC curves can be deconvoluted to approximate the respective average molecular weights distributions and fractions of each mode. Table 3 shows the resultant molecular weights determined from this deconvolution methodology. As shown, there is a range of molecular weights and distributions for each mode for each inventive Example. By way of example, the inventive Example 1 contained 81.6 wt. % high molecular weight fraction having a Mw of 132,291 Daltons. On the other hand, inventive Example 3 contained 61.6 wt. % high molecular weight fraction having a Mw of 216,526 Daltons. In Examples 1-3, the higher molecular weight mode was the majority composition and had the higher comonomer 1-octene content. In addition, the difference in the comonomer 1-octene content between the LMW and HMW modes was at least 20 wt. %. Comparative Example C1 exhibited essentially a monomodal molecular weight and composition distribution. Comparative Example C2 exhibited a bimodal molecular weight and composition distribution. However, the difference in the comonomer 1-octene content between the two modes was less than 10 wt. %. Furthermore, the HMW mode consisted of less than 30 wt. % of the total composition.

Comparative Examples C3-C5 were produced via standard commercial single catalyst, single reactor manufacturing and exhibited essentially monomodal molecular weight distributions.

As seen in Table 9, Inventive Examples 1, 2, and 3 used in blend Inventive Examples Blend 1-Blend 3 exhibited similar or slightly better impact toughness versus the Comparative Examples C1-C5 used in comparative blend Examples Blend C1-Blend C5 when blended alone at equivalent levels in polypropylene. However, when combined with the block composite, BC, there was a strong synergistic toughening effect observed using inventive impact modifier Examples 1-3 used in inventive blend Examples Blend 1-BC-Blend 3-BC, which well exceeded that of Comparative Examples C1-C5 used in comparative blend Examples Blend C1-BC-Blend C5-BC. Furthermore, as shown in Table 9, as we evaluated the viscosity ratio, P, of elastomer to matrix polypropylene, the general trend suggests that elastomer particle size, Da, tracks reasonably well with the viscosity ratio, P. Thus, as a general rule, the lower P yielded a lower elastomer particle size, Da. There was a substantial change in particle size observed when the block composite, BC, was added to these elastomers as part of the blend composition. This was demonstrated previously in US Published Patent Application No. US2011/0082257. However, it can be seen that elastomer particle size did not track necessarily with impact toughness. By way of example, comparative Examples C3 and C3-BC exhibited lower particle size than inventive Examples 1, 2 and 1-BC, 2-BC, respectively. Examples C3 and C3-BC exhibited comparable particle size as compared to inventive Examples 3 and 3-BC, respectively.

For impact strength results, comparative Example Blend C3 exhibited higher impact toughening than Example Blends 1 and 2, and 3. However, when blended with block composite BC, inventive Example Blends 1-BC, 2-BC and 3-BC all yielded substantially higher impact toughening than comparative Example Blend C3-BC. While not wishing to be bound by any theory, it is believed that, at substantially low elastomer particle size, Da, the high molecular weight fraction of the elastomer impact modifier can play an important role in impact toughening. In this case, the low molecular weight (LMW) fraction of the inventive Examples 1, 2, and 3 enabled the elastomer to exhibit sufficiently low viscosity at the minimum shear rate (100 rad/sec) observed for blending in compounding devices such as a twin screw extruder to achieve a low elastomer particle size, Da. If we observe Table 3 and subtract HMW wt. % from 100, we get an approximation of the LMW wt. % fraction. By difference, the LMW weight percent of Examples 1, 2, and 3 were calculated to be 18.4, 30.3 and 38.4 percent. The increase in LMW resulted in a reduced P and a lower Da. The addition of block composite BC enabled additional Da reduction, as shown in Table 9. From Table 2, if we compare the Mw and Mz of inventive Examples 1, 2, and 3, we note that they were substantially higher than comparative Example C3 and increased in value from Example 1 to Example 3. Furthermore, we note from Table 3 that the Mw and Mz of the HMW fraction in the inventive example elastomers increased from Example 1 through Example 3. Thus, we note that, when blended with block composite BC, Example 3, having the highest LMW fraction and highest Mw and Mz of any of the inventive examples yielded an inventive Example Blend 3-BC that exhibited the highest impact strength of any composition in Table 8. In Table 10, inventive Example 3 when used in Example Blend 3 exhibited similar to slightly higher impact toughening versus Comparative Examples C3 or C5 when used in Comparative Example Blends C3 and C5 polypropylene. When combined with block composite BC, this yielded the inventive Blend 3-BC, which exhibited more than twice the impact strength of comparative Blends C3-BC-1 or C5-BC. Comparative blend C3-BC-2 was a repeat of comparative Blend C3 BC-1 and reproduced the impact results of comparative Blend C3-BC-1. The performance of inventive Example 3 is further exemplified when combined with talc. The performance of inventive Example 3 used in Example 3-T, showed similar performance compared with comparative Example C3 used in Example Blend C3-T and somewhat higher performance than comparative Example C5 used in Example Blend C5-T. However, when combined with block composite BC, the resultant inventive Blend 3-BC-T-1 exhibited impact performance that was nearly twice that of either comparative Blend C3-BC-T or comparative Blend C5-BC-T. Inventive Blend 3-BC-T-2 was a repeat of inventive Blend 3-BC-T-1 and reproduced the impact results of inventive Blend 3-BC-T-1.

The invention claimed is:

1. A composition comprising:
   polypropylene;
   an elastomer having a multi-mode molecular weight distribution;
   a block composite; and,
   optionally, a filler,
   wherein the elastomer having a multi-mode molecular weight distribution has a high molecular weight fraction and a low molecular weight fraction,
   wherein the low molecular weight fraction has a weight average molecular weight ranging from 5 kg/mol to 50 kg/mol,
   wherein the elastomer having a multi-mode molecular weight distribution comprises an $I_{10}/I_2$ of from 18 to 36 and an overall Mw/Mn ratio of from 7.04 to less than 13.81, and wherein the difference of the $I_{10}/I_2$ and the overall $M_w/M_n$ ratio is from 10.96 to 22.19.

2. The composition of claim 1 wherein the high molecular weight fraction has a weight average molecular weight ranging from 75 kg/mol to 600 kg/mol.

3. The composition of claim 1 wherein the high molecular weight fraction has a comonomer content that is at least 10 wt % greater than that of the low molecular weight fraction.

* * * * *